Dec. 30, 1930.  B. B. BRIGGS  1,786,934
CONNECTING ROD
Filed April 29, 1926

INVENTOR
B. B. Briggs,
ATTORNEY

Patented Dec. 30, 1930

1,786,934

UNITED STATES PATENT OFFICE

BURDETT B. BRIGGS, OF CHICAGO, ILLINOIS

CONNECTING ROD

Application filed April 29, 1926. Serial No. 105,605.

This invention relates to certain improvements in connecting rods more particularly to a device of this kind especially designed and adapted for use with a crankshaft and a piston wrist pin as is used in automotive internal combustion engines, and it is an object of the invention to provide an adjustable bearing on the wrist pin end of the connecting rod, whereby wear from time to time may be readily taken up without replacing worn parts with new.

Another object of the invention is to provide a novel arrangement of the connecting rod in connection with a crankshaft which is offset out of center line of the piston, for which I have offset the connecting rod housing containing the crankshaft bearing for the rod to a corresponding offset of the piston and crankshaft, so as to give an equal throw or movement between the walls of the piston, thereby providing a connecting rod of greater strength less liable to bend or break and adapted to a higher speed of the engine and a more perfect balance and reduction of strain upon the wrist pin bearing.

Another object of the invention is to provide an improved and efficient means for securing the connecting rod and bearing to the crankshaft.

With the above and other objects in view as will be hereafter apparent the invention consists in certain novel details of construction and combination of the several parts of my improved connecting rod whereby certain important advantages are attained, and the device rendered simpler, less expensive and otherwise more convenient for use, as hereinafter described and specifically claimed.

In order that my invention may be the better understood I will now proceed to describe the same with reference to the accompanying drawings, like characters of reference indicating like parts in the several views, wherein:—

Figure 1:
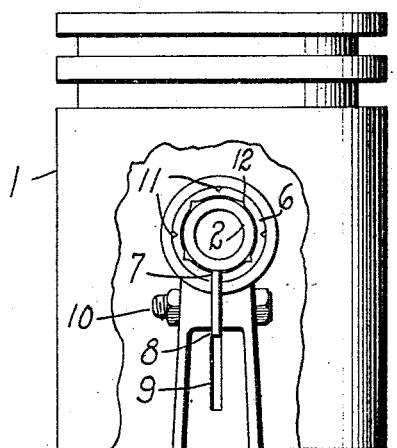
Figure 1 is a view in elevation of a piston and crankshaft, the piston being partly broken away and the crankshaft shown in section to disclose the improved arrangement of a connecting rod applied thereto constructed in accordance with an embodiment of my invention.
Figure 2:
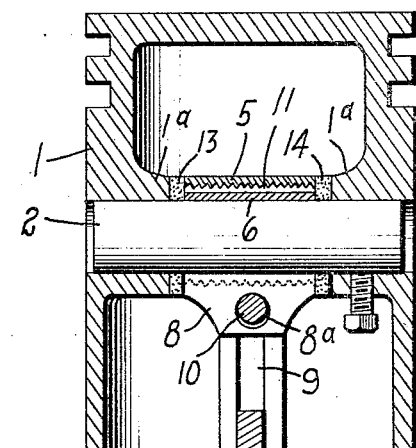
Figure 2 is a vertical view of the connecting rod, crankshaft and piston, and showing the piston and wrist pin end of rod in sectional detail.

As disclosed in the drawings 1 denotes the conventional form of a piston provided with the customary wrist pin 2 secured in the bosses 1a of the piston. 3 denotes the conventional form of a crankshaft. A connecting rod 4 is provided at its piston end with a bushing housing 5, threaded within its bore to receive a threaded bushing 6 provided therefor and fitted on the wrist pin 2. The bushing 6 is provided with a longitudinal slot 7 on one side thereof. A shim 8 is inserted in the vertical slot 9 in the rod and housing adjacent the bushing and engages in the slot 7 of the bushing and holds the bushing against rotation. This shim is fitted so as to have its edge engaging the bushing flush with the bore of the bushing and form a continuous bearing between the slot 7 and the bore of the bushing so that there will be no vacant bearing space at this point upon the wrist pin. A bolt 10 is inserted transversely through the rod and engages a suitable aperture 8a in the shim 8 to clamp the split portion to the rod and housing tight upon the sides of the shim and this bolt also holds the bushing rigid within the housing 5. A plurality of circumferentially spaced grooves 11 are provided on the periphery of the bushing and also circumferentially spaced grooves 12 are provided within the bore of the bushing and spaced intermediate or alternately the grooves 11, these alternately spaced grooves inside the bore and on the periphery of the bushing allow the bushing to be easily contracted or expanded more perfectly in fitting the bushing upon the wrist pin. By reducing the thickness of the shim 8 and forcing the split portion of the rod tight to the shim the bearing may be contracted, and by this means it is manifest that this bearing may be easily adjusted for compensating wear without inserting either a new pin or bushing.

The outer ends of the grooves 11 provide openings whereby a spanner or kindred tool may be engaged with the bushing for inserting same within the housing 5 of the rod. The outer ends of the grooves 12 allow oil to enter the grooves and lubricate the coacting bearing around the wrist pin.

Asbestos or felt washers 13, 14 are provided on the wrist pin between the bosses 1a and the ends of the bushing and housing of the connecting rod for retaining oil for lubricating the wrist pin bearing and also to deaden any side slap or clicking sound that might occur if the bushing and rod should become out of line with the piston by reason of expansion of certain parts or by a bent crank shaft or rod as sometimes happens.

The main arm of the connecting rod 4 between the bearings is made I-beam shape diverging from the wrist pin and to the crankshaft end having the front flange enlarged at its base or crankshaft end as at 4a to provide against extra strain caused by the explosive force at this point.

Figures 3, 4, 5:
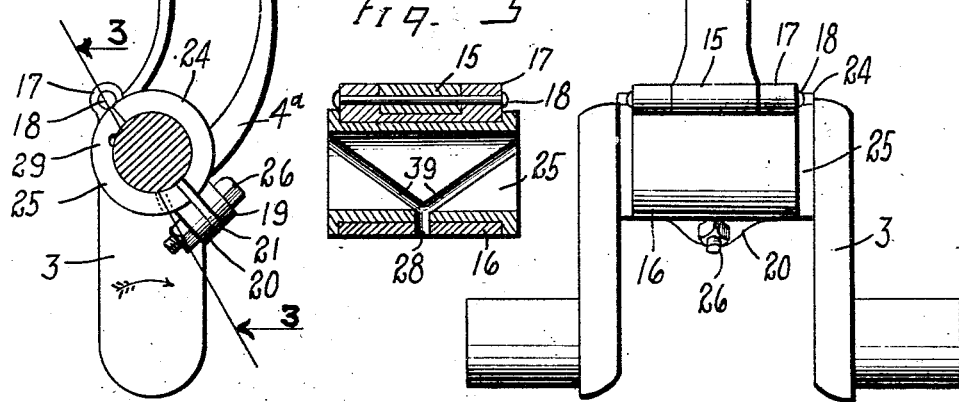
Figure 3 is a sectional detail on lines 3—3 of Figure 1.
Figure 4 is a fragmentary view of the lower end of the connecting rod showing the hinged bushing housing open to receive the bushing.
Figure 5 is a vertical sectional detail of the wrist pin bushing.

The lower or crankshaft end of the rod 4 is made a bell crank shape to provide an offset bushing housing 15, for securing the rod upon the crankshaft. As will be observed in Figure 1, the center of the piston is offset to the right of the dead center line of the crankshaft so as to give a more effective downward explosive force upon the crankshaft. To the housing forming a part of the rod a coacting half housing 16 is hinged as at 17 by a pin or rivet 18 passing through the hinge points provided on 15, 16 at a point above the center line of the housing or at about a forty-five degree angle to the vertical center line of the connecting rod. The free open side of the housing is provided with the usual lugs 19, 20. Inside of this housing is inserted the two half parts of a bushing 24, 25 and these parts are clamped upon the crankshaft by a bolt 26 inserted through the lugs 19, 20, a shim 21 being interposed at this point between the edges of the bushing and the two sides of the housing. An aperture 28 is provided in the lower half or hinged side of the housing 16 and extends through the half bushing 25 at a point to the front of the lug 20, and communicates with oil grooves 29 in the bore of the half bushing 25. These oil grooves 29 radiate upward and outward toward the ends of this half bushing as observed in Fig. 5, and the revolving or turning of the crankshaft to the right will cause oil to be dipped up by the lug 20 to be forced into the aperture 28 and oil grooves 29 and circulated in the direction of rotation, thus providing a simple and efficient lubricating system for this bearing. By locating the oil dip and aperture 28 to the right or rear of the vertical center line of the housing and bearing a finer spray lubrication is produced upon the piston and internal moving parts of the engine and reduces oil pumping commonly found in engines employing the splash feed oil system.

It will be manifest that by using but one shim at the open joint of the housing and have the two half bearings meet or come together at the hinged joint of the housing, facilitates the fitting of the bearing to the crankshaft, and by jointing the housing at an angle on the connecting rod, that the strain upon the hinged joint and the bolted open end is greatly reduced, adding increased strength to this important point of the connecting rod.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A connecting rod having a rod body and an eye at one end thereof, said eye and body having a kerf leading from the eye into said body, means to force the sides of the kerf toward each other and thereby contract the eye, a bushing having a slot extending longitudinally thereof and fitting in said eye and provided with circumferentially spaced longitudinal grooves, and a removable and replaceable shim held in said kerf and slot and having an edge coincident with and conforming to the inner surface of the bushing.

2. A connecting rod having a rod body and an eye at one end thereof, said eye and body having a kerf leading from the eye into said body, means to force the sides of the kerf toward each other and thereby contract the eye, and a bushing having a slot extending longitudinally thereof and fitting in said eye and provided with circumferentially spaced longitudinal grooves, said bushing and eye having screw threaded engagement.

3. A connecting rod having a rod body and an eye at one end thereof, said eye and body having a kerf leading from the eye into said body, means to force the sides of the kerf toward each other and thereby contract the eye, a bushing having a slot extending longitudinally thereof and fitting in said eye and provided with circumferentially spaced longitudinal grooves, said bushing and eye having screw threaded engagement, and a removable and replaceable shim held in said kerf and slot and having an edge coincident with and conforming to the inner surface of the bushing.

4. A connecting rod having a rod body and an eye at one end thereof, said eye and body having a kerf leading from the eye into said body, means to force the sides of the kerf toward each other and thereby contract the eye, a bushing having a slot extending longitudinally thereof and fitting in said eye and provided with circumferentially spaced longitudinal grooves, and a removable and replaceable shim held in said kerf and slot and having an edge coincident with and conforming to the inner surface of the bushing, the grooves of the bushing being in the inner surface thereof.

5. A connecting rod having a rod body and an eye at one end thereof, said eye and body having a kerf leading from the eye into said body, means to force the sides of the kerf toward each other and thereby contract the eye, a bushing having a slot extending longitudinally thereof and fitting in said eye and provided with circumferentially spaced longitudinal grooves, and a removable and replaceable shim held in said kerf and slot and having an edge coincident with and conforming to the inner surface of the bushing, the grooves of the bushing being in the inner surface thereof, said bushing and eye having screw threaded engagement.

6. In a connecting rod, a body, an eye at one end thereof, a bushing in said eye and having circumferentially spaced longitudinally extending grooves in its inner and outer surfaces, said bushing also having a longitudinally extending slot therein, and means carried by the rod and engaging the slot to hold the bushing against rotation in the eye.

7. In a connecting rod, a body, an eye at one end thereof, a bushing in said eye and having circumferentially spaced longitudinally extending grooves in its inner and outer surfaces in staggered relation, said bushing also having a longitudinally extending slot therein, and means carried by the rod and engaging the slot to hold the bushing against rotation in the eye.

8. A connecting rod having a rod body and an eye at one end thereof, said eye and body having a kerf leading from the eye into said body, means to force the sides of the kerf toward each other and thereby contract the eye, a bushing having a slot extending longitudinally thereof and fitting in said eye and provided with circumferentially spaced longitudinal grooves, and a removable and replaceable shim held in said kerf and slot and having an edge coincident with and conforming to the inner surface of the bushing, the grooves of the bushing being in the inner and outer surfaces thereof and arranged in staggered relation.

9. A connecting rod having a rod body and an eye at one end thereof, said eye and body having a kerf leading from the eye into said body, means to force the sides of the kerf toward each other and thereby contract the eye, a bushing having a slot extending longitudinally thereof and fitting in said eye and provided with circumferentially spaced longitudinal grooves, and a removable and replaceable shim held in said kerf and slot and having an edge coincident with and conforming to the inner surface of the bushing, the grooves of the bushing being in the inner and outer surfaces thereof and arranged in staggered relation, said bushing and eye having screw threaded engagement.

10. In combination, a piston having internal wrist pin bosses, a wrist pin extending between said bosses, a connecting rod journalled on said wrist pin, and oil retaining washers mounted on the wrist pin between the rod and said bosses.

11. In combination, a piston having internal wrist pin bosses, a wrist pin extending between said bosses, a connecting rod on said wrist pin, and non-metallic washers mounted on the wrist pin between the rod and said bosses.

12. In combination, a piston having internal wrist pin bosses, a wrist pin extending between said bosses, a connecting rod on said wrist pin, and flexible and shock absorbing fabric washers mounted on the wrist pin between the rod and said bosses.

In testimony whereof I affix my signature.

BURDETT B. BRIGGS.